United States Patent

[11] 3,627,642

[72] Inventors Tadakazu Suyama
Hirakata-shi;
Ken-ichi Izaka, Kadeom-shi; Hiroshi Shirakawa, Yamatotakada-shi, all of Japan
[21] Appl. No. 788,048
[22] Filed Dec. 30, 1968
[45] Patented Dec. 14, 1971
[73] Assignee The Green Cross Corporation
Osaka, Japan
[32] Priority July 16, 1968
[33] Japan
[31] 43/50121

[54] LYSOZYME SALTS
6 Claims, No Drawings
[52] U.S. Cl. .................................................. 195/63,
195/68
[51] Int. Cl. .................................................. C12k 1/00,
C07g 7/02
[50] Field of Search ........................................... 195/62, 63, 66, 68

[56] References Cited
UNITED STATES PATENTS
2,806,815  9/1957  Singh et al. .................. 195/63
OTHER REFERENCES
Petit et al., Chemical Abstracts. Vol. 59 Sept. 1963 (5416e).

*Primary Examiner*—Lionel M. Shapiro
*Assistant Examiner*—D. M. Naff
*Attorney*—Christen, Sabol & O'Brien

ABSTRACT: Lysozyme glutamate or aspartate having anti-inflammatory and antimicroorganism action, and having much more stability to heat than lysozyme itself and having long shelf life, which is prepared from human placentae by extracting lysozyme fraction from frozen human placentae with NaCl treating the fraction with a cation exchange resin, eluting, controlling pH in two steps, i.e., 2.0 –4.0 and then 6.0–9.0, centrifuging, desalting, adding glutamic or aspartic acid to the supernatant solution, heating at 60° C. for 10 hours and adding sulfated polymer to recover the desired lysozyme salts.

LYSOZYME SALTS

The present invention relates to a process for preparing lysozyme salts. More particularly, the present invention relates to a process for preparing lysozyme glutamate and lysozyme aspartate from human placentae.

Lysozyme is known as a mucopolysaccharidase having strong bacteriolytic action. It has an anti-inflammatory action to mucous membranes and is, therefore, useful in the treatment of inflammatory diseases. The lysozyme salts have substantially the same action as those of lysozyme. According to J. P. Jolles [Bull. Soc. Chem. biol. 45, 211, 1963] who discloses purification and analysis of lysozyme extracted from human placenta, to minced placenta is added the same volume of cooled distilled water, pH is controlled to 4.5 with acetic acid, precipitate is centrifugalized, the solution is heated at 100° C. for 1 min. 15 sec. under pH 4.5 and then rapidly cooled in ice water, the solution is standing overnight at 4° C. and centrifuged, the supernatant is treated with Amberlite CG–50 (200–400 mesh, pH 6.5, treated with 0.2 M Na-phosphate buffer), decantated and further washed with 0.2 M a Na-phosphate buffer solution, lysozyme is eluated at pH 6.5 with 0.8 M a Na-phosphate buffer solution and dialyzed at 4° C., pH is controlled to 4.5 with acetic acid to centrifuge in order to obtain crude lysozyme, said lysozyme is treated with carboxymethylcellulose at pH 5.5 and washed with 0.03 M a Na-phosphate buffer solution at pH 5.5, and then gradient elutions are effected at pH 5.5 to 7.2 with 0.03 M a Na-phosphate buffer solution and then at pH 7.2 with 0.1 M a Na-phosphate buffer solution to obtain purified lysozyme. French Pat. No. 1,444,176 discloses preparation of lysozyme ascorbate from egg white by adding NaCl thereto, precipitation impurities at pH 9.8, standing the solution at pH 9.8 to give a precipitate of lysozyme, dissolving the precipitate in $H_2O$, adding HCl to pH 4.5 in order to separate precipitate, controlling pH finally to 9.8 with NaCl and $Na_2CO_3$ in order to produce precipitate of lysozyme, repeating the dissolution and the precipitation as above of the precipitate to obtain purified lysozyme, adding water and then ascorbic acid to a paste of lysozyme, filtering an opalescent solution thus obtained to obtain a solution of lysozyme ascorbate and treating the solution under $CO_2$ to collect crystals of the ascorbate.

An object of the present invention is to provide a method for preparing the lysozyme salts from the human placentae. Another object of the present invention is to prepare lysozyme glutamate and lysozyme aspartate from the human placentae in a commercial scale, which are safe for venous injection and free from pyrogen.

Lysozyme prepared from the human placentae is without fear of contamination by heterogenous proteins and is completely absent from anaphlaxylike side effects caused by the heterogeneous proteins. The human placentae are, therefore, suitable for the source of lysozyme. However, lysozyme derived from the human sources is heat-labile and loses 80–90 percent of activity even heating at 60° C. for 10 hours.

The inventors have found that lysozyme can be isolated in pure form and made heat-stable by converting it into the corresponding salts by treatment with glutamic acid or aspartic acid. According to the present invention, lysozyme extracted from human placentae is reacted with glutamic acid or aspartic acid at 60° C. for 10 hours to produce lysozyme salts which are stable to heat. Sulfated polymer such as chondroitin sulfuric acid and dextran sulfate is added to the salts to precipitate contaminating proteins, with the result that purified lysozyme which is suitable for injection is obtained.

According to the present invention, a solution of sodium chloride is added to fresh or freshly preserved human placentae to extract the fractions containing lysozyme, lysozyme is collected on a cation exchange resin equilibrated with a 0.05 M phosphate buffer solution (pH 6.0–7.5), lysozyme is eluted from the cation exchange resin with a diluted alkaline solution (pH 9.5–11.0) such as NaOH, KOH and $(NH_4)_2HPO_4$, neutral salts such as $Na_2SO_4$, $MgSO_4$ or such organic solvents as ethanol and the like are added thereto to precipitate the fraction containing lysozyme, a diluted acidic solution such as HCl, acetic acid is added to the fraction to control pH at 2.0 to 4.0, the pH is controlled again at 6.0 to 9.0 with KOH or NaOH, centrifugal force is applied to remove hemoproteins, the supernatant lysozyme solution is desalted, pH is controlled at 7.0–8.0, glutamic acid or aspartic acid is added thereto and the mixture is heated at 60° C. for 10 hours to form the glutamate or aspartate of lysozyme, sulfated polymer is added to the products to precipitate contaminating proteins, the precipitate is centrifugalized, and the supernatant fraction is sterilized.

The reaction of lysozyme with amino acids having affinity to lysozyme produces the heat-stable products, the activity of which is not destroyed during the reaction. The product salts can be preserved at room temperature for an extended period of time. The infection sources such as hepatitis virus and the like contained in the raw materials are killed by the heat-treatment and the contaminating proteins are also removed by addition of the sulfate polymers. The present salts are completely safe even in the intravenous injections and sterile injectable.

The phosphate buffer solution should have pH value of 0.6 to 7.0. The pH value mentioned above is optimum in selectively adsorbing lysozyme on the cation exchange resin and removing albumin and a part of contaminating protein such as hemoproteins. The cation exchange resin is preferably carboxymethylcellulose and carboxymethyldextran. Since lysozyme is a strongly basic protein it is selectively and strongly adsorbed on the cation exchange resin at pH 6.0–7.0. It is hardly eluted at neutral pH, but efficiently eluted by an alkaline solution having pH value of 9.5 to 11.0. Ammonium sulfate or other neutral salts, or organic solvents such as ethanol, acetone and the like are preferable to precipitate the fraction containing lysozyme from the eluate.

Lysozyme come from human placentae contains a large amount of hemoprotein. Almost all hemoproteins precipitate by adjusting pH in two steps, i.e., firstly to 2.0–4.0 and subsequently to 6.0–9.0. Lysozyme remaining in the supernatant has the specific activity 5 to 6 times as high as the activity of the raw materials. However, it is still low in activity to be used as an injectable medicine.

In order to increase the specific activity, desalination of the lysozyme containing supernatant thus obtained is effected by gel filtration on the cross-linked dextran having approximate exclusion limit (molecular weight) of 5,000 and particle size of 100 to 300. Glutamic acid or aspartic acid is added to the desalted solution at the pH value of 7.0 to 8.0. The reaction of lysozyme with these amino acids is effected at 60° C. for 10 hours and lysozyme glutamate or lysozyme aspartate is produced by the reaction. After completion of the reaction, the reaction mixture is cooled to 10° to 20° C. and the sulfated polymer such as chondroitin sulfate and dextran sulfate is added thereto in the proportion of 0.1 to 1.0 percent to precipitate the contaminating proteins. After removal of the contaminating proteins by centrifugation, the lysozyme fraction in the supernatant is sterilized and filtered to give sterile injectable lysozyme. The specific activity of lysozyme is increased to 25 times as high as that of the raw materials by the purification treatment.

Properties of the present aspartate and glutamate are shown in the following table comparing with lysozymes from human placenta and from egg white.

| | Lysozyme aspartate (from human placenta) | Lysozyme glutamate (from human placenta) | Lysozyme (from human placenta) | Lysozyme (from egg white) |
|---|---|---|---|---|
| Pharmacologic activity. | Bacteriolysis, anti-anaphylaxis, anti-virus, potentiation of antibiotics' effect. | Bacteriolysis, anti-anaphylaxis, anti-virus, potentiation of antibiotics' effect. | Bacteriolysis, anti-anaphylaxis, anti-virus, potentiation of antibiotics' effect. | Bacteriolysis, anti-anaphylaxis, anti-virus, potentiation of antibiotics' effect. |

|  | Lysozyme aspartate (from human placenta) | Lysozyme glutamate (from human placenta) | Lysozyme (from human placenta) | Lysozyme (from egg white) |
|---|---|---|---|---|
| Sensitivity against bacteria. | Active against: *M. lysodcikticus, B. subtilis.* | Active against: *M. lysodcikticus, B. subtilis.* | Active against: *M. lysodcikticus, B. subtilis.* | Active against: *M. lysodcikticus, B. megatherium, B. subtilis, Sarcina lutea, Sarcina flava, Achrombacter fischeri, Thermophilic bacterium, Staphylococcus aurens, Proteus vulgaris.* |
| Stable pH range | 3.5 to 6.0 | 3.5 to 6.0 | 2.0 to 8.0 | 2.0 to 8.0. |
| Optimum temperature (° C.). | 25 to 50 | 25 to 50 | 25 to 37 | 2.5 to 55. |
| Inactivation by temperature. | Not at 60° C., 10 hours. | Not at 60° C., 10 hours. | 70 to 80% is lost: at 60° C., 10 hrs.; or 100° C., 10 min. | Not at 100° C., 45 min. |
| Molecular weight | 15,000 | 15,000 | 15,000 | 14,500. |

The present invention is illustrated by a practical example.

The placenta delivered is immediately frozen in a freezer to prevent putrefaction and to keep fresh. These frozen placentae are collected from hospitals and maternity hospitals. Each 500 placentae is crushed roughly in an ice crusher and cut into small pieces by a meatcutter. To about 270 kg. of thus finely cut placentae is added 500 l. of a 0.05 M sodium chloride solution and the mixture is agitated for 30 minutes to extract the lysozyme fraction. The mixture is centrifuged to separate the extract. To the extract is added 1,500 g. of carboxymethylcellulose equillibrated with a 0.05 M phosphate buffer solution having pH value of 6.5. The mixture is agitated for 60 minutes and is subsequently allowed to stand. The supernatant is removed and the precipitates are collected by either filtration or centrifugation. The collected precipitates are washed with a 0.05 M phosphate buffer solution having pH value of 6.5 until the washings become colorless and clear. The precipitates are suspended in a 0.5 M aqueous sodium chloride solution and pH value of the solution is adjusted to 10.0 with addition of a 5 N aqueous sodium hydroxide solution. The solution is either filtered or centrifuged to extract lysozyme.

Ammonium sulfate is added to the extract with agitation until the final concentration thereof reaches 30 percent by weight based on the total mixture. The mixture is agitated for 60 minutes to precipitate globulin and a part of hemoproteins. The precipitates are removed by centrifugation and ammonium sulfate is again added to the supernatant until the final concentration thereof reaches 60 percent by weight based upon the total mixture and agitation is continued for 3 hours to precipitate lysozyme. The lysozyme is dissolved in distilled water and the solution is filtered. The filtrate is a concentrated solution of lysozyme. The pH of the solution is adjusted to 2.5 with 5 N hydrochloric acid and the solution is allowed to stand for 15 minutes and the pH thereof is again adjusted to 7.5 and allowed to stand for 15 minutes. The majority of the hemoproteins is removed by centrifugation.

The supernatant is desalted by use of Sephadex G-25. Aspartic acid is added to the solution in the rate of 10 mg. per ml. after adjustment of the pH thereof to 7.5. The mixture is reacted at 60° C. for 10 hours to form lysozyme aspartate. The reaction mixture is subsequently cooled to 10° to 20° C. and chondroitin sulfate is added thereto in the proportion of 0.3 percent by weight to precipitate the contaminating proteins. The precipitate is removed by centrifugation. The lysozyme fraction in the supernatant is sterilized by filteration to obtain about 62,000 mg. of the desired sterile product. The reaction conditions are almost the same in the reaction with glutamic acid and in use of dextran sulfate as in that with aspartic acid and chondroitin sulfate.

What is claimed is:

1. A process for preparation of lysozyme salts which comprises extracting lysozyme from human placentae preserved in a frozen state immediately after deliveries, collecting the lysozyme from the extract on a cation exchange resin, washing the adsorbed lysozyme and then eluting the lysozyme with a dilute alkali solution, initially controlling the pH of the eluate to 2.0 to 4.0 and subsequently to 6.0 to 9.0, centrifuging the solution to remove hemoproteins, desalting the supernatant solution, adding thereto an amino acid selected from the group consisting of glutamic and aspartic acids in a final concentration of about 10 mg. per ml., heating the mixture at 60° C. for 10 hours, adding a sulfated polymer to the reaction mixture to remove protein impurities and recovering the lysozyme salts.

2. The process according to claim 1 wherein the amino acid is glutamic acid.

3. A thermally stable lysozyme glutamate prepared according to the process of claim 2.

4. The process according to claim 1 wherein the amino acid is aspartic acid.

5. A thermally stable lysozyme aspartate prepared according to the process of claim 4.

6. The process according to claim 1 wherein the extraction from human placentae is effected with sodium chloride.

* * * * *